Patented Mar. 20, 1945

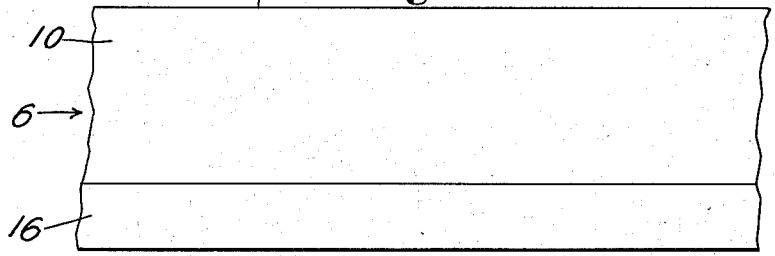
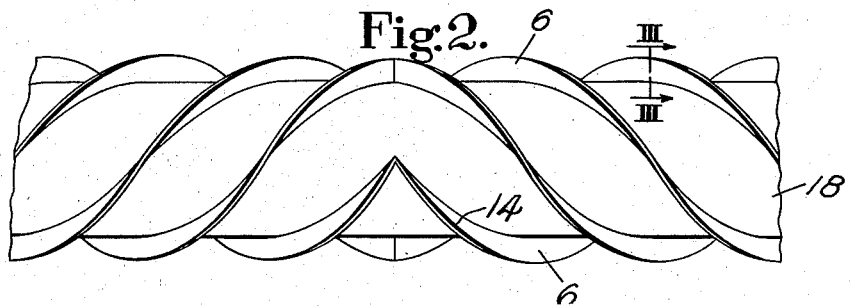
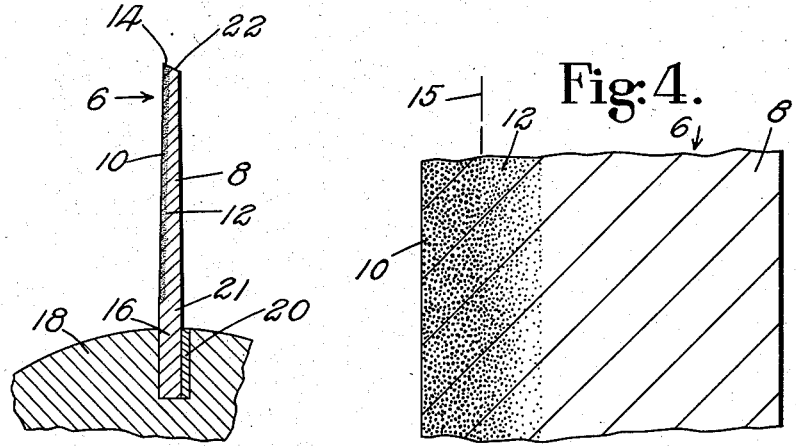

2,371,600

UNITED STATES PATENT OFFICE 2,371,600

BLADE FOR TANNING MACHINERY

Edward L. Bartholomew, Marblehead, Mass., assignor to United Shoe Machinery Corporation, Flemington, N. J., a corporation of New Jersey Application November 27, 1942, Serial No. 467,693

1 Claim. (Cl. 69—37)

This invention relates to blades having a hardened edge of substantial length. While the invention is illustrated as embodied in helical blades for tanning machinery it is to be understood that in certain novel and useful aspects the invention is not limited to the article precisely described herein.

Helical blades for tanning machinery have heretofore been constructed by welding together strips of metal differing in their constituent elements and in their qualities, particularly with reference to the degree to which such strips may be hardened, it being understood that the blades are so made as to provide a hardened cutting edge backed by a softer and tougher layer of metal which will prevent cracking of the blade under the strains imposed during treatment of hides and skins in unhairing, fleshing, putting-out, setting and shaving operations. It is common in the manufacture of such blades by well-known methods to heat the metal strips to relatively high temperatures, superpose the thinner high-carbon strip upon the thicker low-carbon backing strip, in a receiving groove in the latter, and then to subject the strips thus assembled to repeated heating and rolling operations until the two strips are welded together with the high-carbon strip completely embedded in the softer backing strip, this welding of the strips being followed by a splitting operation down the middle of the high-carbon insert to provide two strips of similar size and each with a hardened cutting edge. During such relatively prolonged heating and rolling operations, a surface layer on the high-carbon strip portion is partially decarburized. More important still, this partially decarburized layer is uneven in thickness, producing what may be termed a spotty condition. It follows that in the use of such blades the cutting edge tends to wear unevenly, particularly in the hard usage which these blades receive in shaving operations, such uneven wearing tending to interfere with uniform operation of the blade as a cutting instrument. Moreover, it occasionally happens that the union of the welded strips is defective. Since such a condition cannot be readily detected, the defective portion gives way while in use, such chipping away of the cutting edge of the blade sometimes causing scratches or other damage to a work piece.

I have discovered that helical blades for tanning machinery made from suitable stock, such as soft steel, and having a hardened edge portion produced by local carburization of a selected portion of the front side of the blade, conducted in such manner as to leave a soft tough backing portion or rear side, will produce a blade which is more uniform in the degree of hardness of the carburized surface portion thus minimizing if not entirely avoiding the spotty condition that is so apt to be present in welded blades. Moreover, carburized blades are not subject to the chipping defect of welded blades since there is no sharp line or boundary of the hardened portion in carburized blades but a gradual transition from hard to soft portions or layers which constitutes a perfect union or what may be termed a bond of appreciable depth between the layers. Not only do these blades operate upon work pieces in a more uniform manner but they are cheaper to manufacture and may be made from soft steel stock practically always obtainable in the market.

In the drawing,

Fig. 1 is a plan view of a portion of a blade, viewing the front or oncoming side which presents a hardened surface ending in a scraping or cutting edge;

Fig. 2 is a view showing helical blades in place in the grooves in the surface of a cylindrical member;

Fig. 3 is a section taken along the line III—III of Fig. 2, the sectional view of the blade being diagrammatic to illustrate the relative proportions of the hardened and non-hardened portions of the blade; and Fig. 4 is an enlarged sectional view showing diagrammatically the relationship of the various layers of the blade.

In the illustrated construction, which is specially designed to serve as a helical scraping or scraping-cutting blade for use in tanning machinery, there is shown a long, thin and flat steel blade 6 having a main backing portion 8 of relatively soft low-carbon steel, the amount of carbon being preferably in the range of .06% to .20%. Said blade is provided with a hardened cutting layer 10 by a process of carburization (and subsequent hardening), the amount of carbon being raised in this layer to such a degree as to bring it into the field of tool steel, that is, with a carbon content in the range of .90% to 1.00%. Between the layers 8 and 10 is an intermediate or connecting layer 12, integral with layers 8 and 10, in which the carbon content shades off gradually from the high-carbon condition of layer 10 to the lower carbon content of layer 8.

The relation of the hardened layer 10 to the body 8 of the blade is well indicated in the sectional view of Fig. 4. It will be observed that the lower-carbon backing 8 at all points is substantially thicker than the cutting layer 10 so as to form a soft tough backing which will support the harder more brittle layer and prevent cracking of the latter under the stress and strains incident to scraping and cutting operations in which force is applied in a direction transverse to the length of the blade and crosswise of the sharp edge of the blade. Since the first step in the formation of the hardened layer 10 is through localized carburization, the intermediate layer 12 varies in its carbon content and shades off gradually into the soft backing portion of which it is an integral part. This gradual variation in carbon content gives a bond of appreciable depth between the two outer layers. Upon careful examination of the completed blade 6, that is after it has been subjected to suitable heating and quenching operations, it will be found that the carburized cutting layer 10, which is to provide the cutting or scraping edge 14 of the blade, has a thickness of about $20/1000$ of an inch and a hardness of about 65 Rc. From the $20/1000$ of an inch depth (indicated by the dash line 15) the hardness of the layer 12 decreases rapidly from about 65 Rc. to about 20 Rc. at a depth of about $40/1000$ of an inch, which is about the hardness of the backing layer 8 of the blade. It is found furthermore that the carburized cutting layer 10 is quite uniform in thickness and in its hardness characteristics throughout the first $20/1000$ of an inch thickness of the blade.

One edge of the blade 6 is termed the butt edge 16 since it is used in fastening the blade in position on its driving element or holding member 18. In the illustrated construction, the holding member 18 is a cylinder carrying a plurality of helical blades 6 each of which is inserted in a helical groove in the cylindrical surface. Ordinarily, a piece of soft iron strip 20 is tamped into the groove in contact with one surface of the butt 16 of the blade, the said strip 20 and the butt 16, being of the same relative softness, will conform to each other under the tamping operations in a manner to secure a tight fit in the groove by which the blade is securely fixed in place in the cylinder 18.

It will be noted that the blade 6 has a body portion 21 ending in the butt portion 16 and that said body portion 21 is not provided with a cutting layer such as the layer 10, since it would not be usable. The reason for this resides in the fact that the blade is never worn down to the surface of the cylinder 18. Commonly the blades are removed and new ones substituted when they have become worn to about a half inch above the surface of the cylinder.

After the blades have been placed in the cylinder the latter is rotated, usually in place in the machine in which it is to be used, while a grinder operates to sharpen the blades on the cutting edge thereof, the arrangement being such that the blades are sharpened in a manner to back them off as indicated at 22 in Fig. 3, whereby a sharp scraping or cutting edge is provided as indicated at 14.

According to one method of making these blades, strips of steel suitable for blades and possessing the quality of toughness and the capacity for producing a hardened surface are treated as follows. First, a portion of the strip is varnished to protect the part which is subsequently to be hardened. Subsequently this varnished strip is introduced into an electrolytic bath for the deposition of copper upon all of the unvarnished portion of the strip. Subsequently, the strip is introduced into a carburizing furnace where the varnish is burned off and the portion beneath carburized to provide a hardened layer extending only part way through the thickness of the strip. Since this layer is located on the front or oncoming face of the completed blade and extends into one edge of the strip, it provides a hardened scraping or cutting edge in the completed blade. Subsequently this strip may be heated and formed into a helix of the required shape to make a helical blade for tanning machinery.

In accordance with another method of making my blade, suitable strips of steel are spot welded together in pairs, the spot welding step being carried out at the four corners of the assembled strips. Where the blades are of substantial length it may be necessary to spot weld at one or more points along one edge of the assembled blades between the corners thereof, it having been found that during the carburizing operation the blades tend to warp somewhat, thus exposing some portion of the opposed surfaces to the carburizing gases of the furnace unless such strips are adequately held together. Following the spot welding of the strips in pairs they are provided with holes at two or more places along one edge of each pair. Such edge portion subsequently becomes the butt edge of the strip which remains relatively soft and is set in a groove in a cylinder. The holes are conveniently made by a punching operation so that the strip pairs may be assembled upon two or more rods to form a stack of the spot welded strips. In assembling the pairs of strips upon the rods, care is taken to have them extend alternately in opposite directions from the rods with the result that the described butt edges of the strips are overlapped in the stack, the purpose being to prevent carburization of the surfaces thus covered in the described method of stacking. As indicated above, the purpose of spot welding the strips together in pairs is to prevent carburization of the surfaces thus opposed.

Preferably, in the making up of a stack of strips, a cover plate is provided at both the bottom and top of the stack, said cover plate being substantially the size of the butt portion of one of the strips, the purpose being to protect what would otherwise be an exposed surface on the top and bottom strip of the stack, since if unprotected the whole of such surfaces would be carburized when the stack is introduced into the carburizing furnace.

During treatment in the carburizing furnace the exposed portions of each pair of strips are carburized, the treatment being continued until a carburized layer of a certain depth is formed. The stacks of strips are then removed, allowed to cool, and then disassembled. In order to separate the strips of each pair, a shearing operation is commonly performed during which a portion is sheared off by a suitable power operated machine. Usually, a half inch is sheared off at opposite ends of the paired strips thus removing the spot-welded portions at the four corners of each pair and permitting the strips to be separated, it being understood in this connection that any welding operation along the cutting edge of the strips between the corners thereof will be relatively light in character so that a light blow of the strips will separate them after their ends have been sheared.

The strips, whether locally carburized by the copper-plating method or by the stacking method just described, are now ready for the next operation in which they are formed into helical blades. For this purpose the strips are introduced into a furnace and heated to a temperature of around 1600° F. and thus made suitable for the bending and spiralling operation which is effected by a machine provided for the purpose. It will be understood, of course, that the strip is introduced into this machine in such manner that the butt of the strip will form the concave edge of the helical blade while the carburized portion of the strip is extended into the convexly curved cutting edge of the blade.

Since there is always a certain amount of distortion taking place in blades while cooling immediately after their formation in helical form, it has been found desirable to place the blades promptly from the forming machine into a two-part mold, the opposed surfaces of which are also of the desired helical form so that when the two-part mold is pressed against the blade the latter is held in a predetermined helical shape during cooling thereof. Cooling of the blade, and the consequent quenching thereof, is conveniently expedited by a shower of water discharged upon the blade and upon the mold parts immediately after the latter have been closed upon the blade. This quenching operation is practically instantaneous, since both the water and the mold parts are of sufficient mass and temperature to cool the blade very promptly. The blades are now in shape and in suitably hardened condition to be placed in the helical grooves of a cylindrical core or shaft to form a helically bladed cylinder for use in such tanning machinery as unhairing, fleshing, putting-out, and shaving machines.

Having described my invention, what I claim as new and desire to secure by Letters Patent of the United States is:

As an article of manufacture, a long, thin and flat steel blade for use in scraping and cutting operations, said blade being of such form as to be attachable along its length to a driving cylinder and being of helical formation and consisting of a single integral strip having a long, thin working edge and the portion of one flat side of the blade adjacent to said edge carburized to form a layer of high-carbon tool steel to serve as a cutting layer, an intermediate layer wherein the carbon content gradually decreases in a direction away from the high-carbon layer, the main portion of the blade being moderately soft to serve as a relatively tough backing for the said cutting layer and as a base or butt portion to conform readily to a groove of the driving cylinder in which it is adapted to be inserted, said main portion at all points being substantially thicker than the cutting layer, the cutting layer and intermediate layer being formed by carburizing a single piece of moderately soft steel giving a bond of appreciable depth between the cutting and backing layers due to the said intermediate layer.

EDWARD L. BARTHOLOMEW.